United States Patent
Razavi Majomard et al.

(10) Patent No.: US 12,267,122 B2
(45) Date of Patent: Apr. 1, 2025

(54) LINK TRAINING FOR A FULL-DUPLEX ETHERNET LINK

(71) Applicant: MARVELL ASIA PTE LTD, Singapore (SG)

(72) Inventors: Seid Alireza Razavi Majomard, Belmont, CA (US); Ehab Tahir, Mississauga (CA); Ragnar Hlynur Jonsson, Aliso Viejo, CA (US)

(73) Assignee: Marvell Asia Pte Ltd, Singapore (SG)

( * ) Notice: Subject to any disclaimer, the term of this patent is extended or adjusted under 35 U.S.C. 154(b) by 154 days.

(21) Appl. No.: 17/885,559

(22) Filed: Aug. 11, 2022

(65) Prior Publication Data
US 2023/0050128 A1 Feb. 16, 2023

Related U.S. Application Data

(60) Provisional application No. 63/392,523, filed on Jul. 27, 2022, provisional application No. 63/232,451, filed on Aug. 12, 2021.

(51) Int. Cl.
*H04B 3/23* (2006.01)
*H04L 5/14* (2006.01)
*H04L 25/03* (2006.01)

(52) U.S. Cl.
CPC .............. *H04B 3/231* (2013.01); *H04L 5/14* (2013.01); *H04L 25/03006* (2013.01); *H04L 2025/0377* (2013.01)

(58) Field of Classification Search
CPC . H04B 3/231; H04B 3/04; H04B 3/32; H04B 3/23; H04L 5/14; H04L 25/03006; H04L 2025/0377
See application file for complete search history.

(56) References Cited

U.S. PATENT DOCUMENTS

| | | | |
|---|---|---|---|
| 5,864,545 A | 1/1999 | Gonikberg et al. | |
| 6,078,645 A | * 6/2000 | Cai | H04B 3/23 379/3 |
| 6,266,367 B1 | * 7/2001 | Strait | H03H 21/0012 375/229 |

(Continued)

OTHER PUBLICATIONS

IEEE Std 802.3ch-2020—"IEEE Standard for Ethernet—Amendment 8: Physical Layer Specifications and Management Parameters for 2.5 GB/s, 5 GB/s, and 10 GB/s Automotive Electrical Ethernet," IEEE Computer Society, pp. 1-207, year 2020.

(Continued)

*Primary Examiner* — Dac V Ha
(74) *Attorney, Agent, or Firm* — Meitar Patents Ltd.; Daniel Kligler

(57) ABSTRACT

A communication system includes a first physical-layer (PHY) transceiver and a second PHY transceiver. The first PHY transceiver includes (i) a first transmitter and (ii) a first receiver including a first equalizer. The second PHY transceiver includes (i) a second transmitter and (ii) a second receiver including a second equalizer. The first PHY transceiver and the second PHY transceiver are configured to communicate with one another over a full-duplex link, including training the first equalizer on a second training signal transmitted from the second PHY transceiver, and concurrently training the second equalizer on a first training signal transmitted from the first PHY transceiver.

16 Claims, 2 Drawing Sheets

(56) References Cited

U.S. PATENT DOCUMENTS

| | | | |
|---|---|---|---|
| 7,388,909 B2* | 6/2008 | Lin .................. | H04L 25/03146 |
| | | | 375/232 |
| 8,320,411 B1 | 11/2012 | Sedarat et al. | |
| 11,843,483 B2* | 12/2023 | Razavi Majomard . | H04B 3/237 |
| 2009/0154536 A1* | 6/2009 | Agazzi .................... | H04B 3/23 |
| | | | 375/220 |
| 2018/0294826 A1* | 10/2018 | Fouche .................. | H04B 1/40 |
| 2019/0089463 A1* | 3/2019 | Zhang .................... | H04B 10/27 |

OTHER PUBLICATIONS

International Application # PCT/IB2022/057492 Search Report dated Jan. 23, 2023.

* cited by examiner

LINK TRAINING FOR A FULL-DUPLEX ETHERNET LINK

CROSS-REFERENCE TO RELATED APPLICATIONS

This application claims the benefit of U.S. Provisional Patent Application 63/232,451, filed Aug. 12, 2021, and U.S. Provisional Patent Application 63/392,523, filed Jul. 27, 2022, whose disclosures are incorporated herein by reference.

FIELD OF THE DISCLOSURE

The present disclosure relates generally to network communication, and particularly to training of Physical Layer (PHY) transceivers in full-Duplex network links.

BACKGROUND

Some communication systems employ full-duplex communication, i.e., carry out bidirectional communication over the same physical link. Full-duplex communication for automotive Ethernet networks is specified, for example, in IEEE standard 802.3ch-2020, entitled "IEEE Standard for Ethernet—Amendment 8: Physical Layer Specifications and Management Parameters for 2.5 Gb/s, 5 Gb/s, and 10 Gb/s Automotive Electrical Ethernet," Jun. 30, 2020, which is incorporated herein by reference.

The description above is presented as a general overview of related art in this field and should not be construed as an admission that any of the information it contains constitutes prior art against the present patent application.

SUMMARY

An embodiment that is described herein provides a communication system including a first physical-layer (PHY) transceiver and a second PHY transceiver. The first PHY transceiver includes (i) a first transmitter and (ii) a first receiver including a first equalizer. The second PHY transceiver includes (i) a second transmitter and (ii) a second receiver including a second equalizer. The first PHY transceiver and the second PHY transceiver are configured to communicate with one another over a full-duplex link, including training the first equalizer on a second training signal transmitted from the second PHY transceiver, and concurrently training the second equalizer on a first training signal transmitted from the first PHY transceiver.

In some embodiments, the first PHY transceiver further includes a first echo canceler, the second PHY transceiver further includes a second echo canceler, and the first PHY transceiver and the second PHY transceiver are configured to train the first echo canceler and the second echo canceler concurrently, using the first and second training signals.

In some embodiments, the first PHY transceiver further includes a first crosstalk canceler, the second PHY transceiver further includes a second crosstalk canceler, and the first PHY transceiver and the second PHY transceiver are configured to train the first crosstalk canceler and the second crosstalk canceler concurrently, using the first and second training signals.

In a disclosed embodiment, the first PHY transceiver is configured to transmit the first training signal using a same modulation subsequently used for transmitting data to the second PHY transceiver. In an embodiment, the first PHY transceiver is configured to transmit the first training signal in accordance with a first clock signal, and the second PHY transceiver is configured to transmit the second training signal in accordance with a second clock signal that is independent of the first clock signal.

In an example embodiment, the first PHY transceiver further includes a clock recovery circuit, a resampling circuit, and a first echo canceler. The clock recovery circuit is configured to recover the second clock signal from the second training signal received from the second PHY transceiver. The resampling circuit is configured to resample the first training signal produced in the first transmitter, in accordance with the recovered second clock signal. The first echo canceler is configured to cancel, using the resampled first training signal, an echo of the first training signal in the received second training signal.

In an embodiment, the first PHY transceiver is configured to transmit the first training signal using four-level Pulse-Amplitude Modulation (4-PAM).

There is additionally provided, in accordance with an embodiment that is described herein, a physical-layer (PHY) transceiver including an interface, a transmitter, a receiver including an equalizer, an echo canceler, and a controller. The interface is configured to connect to a full-duplex link for communicating with a peer PHY transceiver. The controller is configured to perform one or both of: training the equalizer concurrently with training of an equalizer of the peer PHY transceiver; and training the echo canceler concurrently with training of an echo canceler of the peer PHY transceiver.

There is also provided, in accordance with an embodiment that is described herein, a communication system including a first physical-layer (PHY) transceiver and a second PHY transceiver. The first PHY transceiver is configured to transmit a first training signal over a full-duplex link in accordance with a first clock signal. The second PHY transceiver is configured to transmit a second training signal over the full-duplex link in accordance with a second clock signal that is independent of the first clock signal. The first PHY transceiver and the second PHY transceiver are configured to perform link training concurrently, using the first training signal and the second training signal.

There is further provided, in accordance with an embodiment that is described herein, a physical-layer (PHY) transceiver including an interface, a transmitter, a receiver, and a controller. The interface is configured to connect to a full-duplex link for communicating with a peer PHY transceiver. The controller is configured to perform link training using a training signal modulated with a modulation scheme, and to subsequently communicate data with the peer PHY transceiver using a same modulation used for the link training.

There is also provided, in accordance with an embodiment that is described herein, a communication method including transmitting a first training signal from a first physical-layer (PHY) transceiver to a second PHY transceiver over a full-duplex link, and transmitting a second training signal from the second PHY transceiver to the first PHY transceiver over the full-duplex link. A first equalizer in the first PHY transceiver is trained using the second training signal transmitted from the second PHY transceiver, and a second equalizer in the second PHY transceiver is concurrently trained using the first training signal transmitted from the first PHY transceiver.

There is additionally provided, in accordance with an embodiment that is described herein, a communication method including, using a physical layer (PHY) transceiver, communicating with a peer PHY transceiver over a full-duplex link. One or both of the following are performed:

training an equalizer of the PHY transceiver concurrently with training of an equalizer of the peer PHY transceiver; and training an echo canceler of the PHY transceiver concurrently with training of an echo canceler of the peer PHY transceiver.

There is also provided, in accordance with an embodiment that is described herein, a communication method including transmitting a first training signal from a first physical-layer (PHY) transceiver to a second PHY transceiver over a full-duplex link in accordance with a first clock signal, and transmitting a second training signal from the second PHY transceiver to the first PHY transceiver over the full-duplex link in accordance with a second clock signal that is independent of the first clock signal. Link training is performed in the first PHY transceiver and the second PHY transceiver concurrently, using the first training signal and the second training signal.

There is additionally provided, in accordance with an embodiment that is described herein, a communication method including, using a physical layer (PHY) transceiver, communicating with a peer PHY transceiver over a full-duplex link. Link training is performed in the PHY transceiver using a training signal modulated with a modulation scheme. Subsequently, data is communicated with the peer PHY transceiver using a same modulation used for the link training.

The present disclosure will be more fully understood from the following detailed description of the embodiments thereof, taken together with the drawings in which:

DETAILED DESCRIPTION OF EMBODIMENTS

Figure 1:
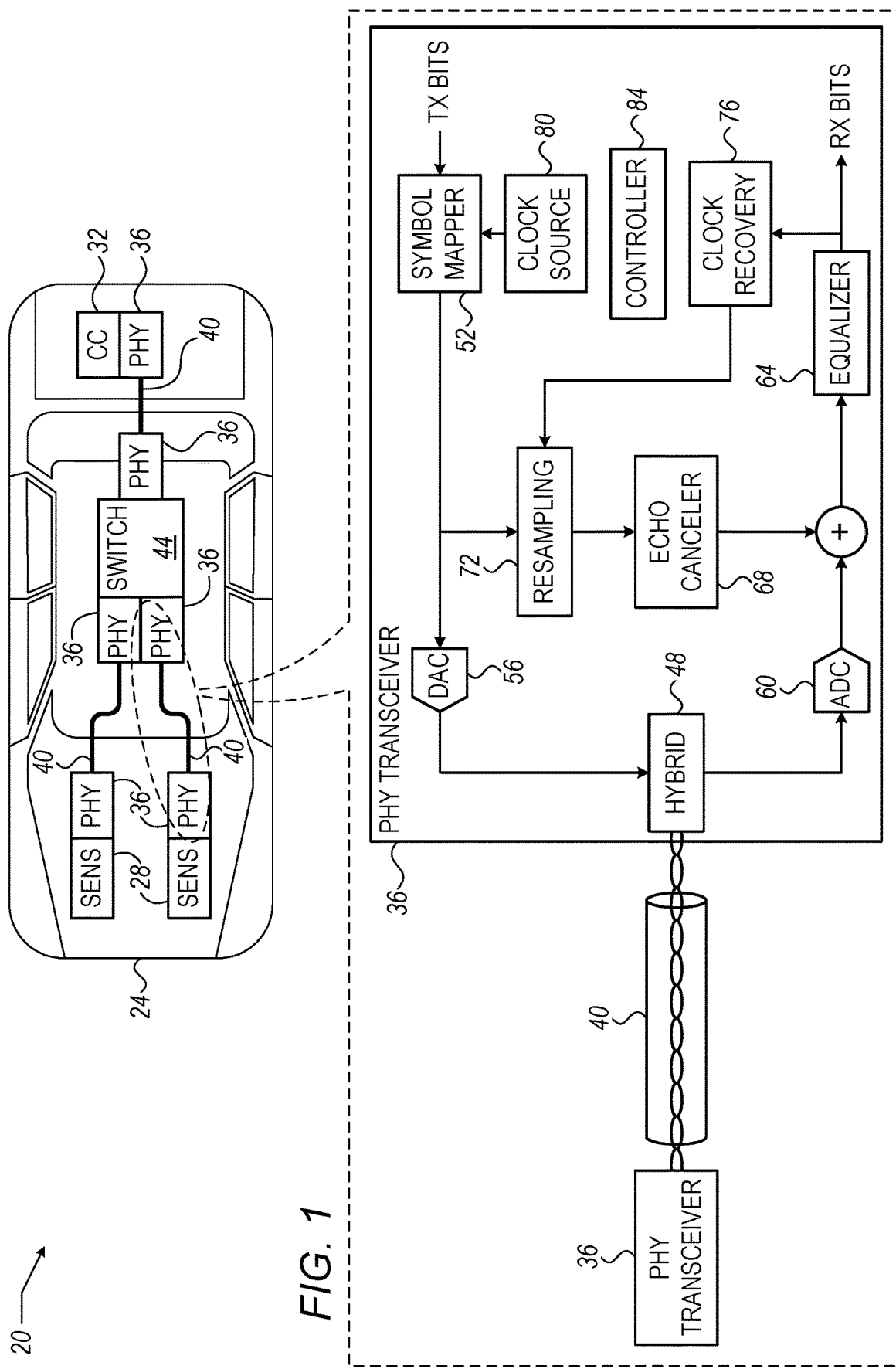
FIG. 1 is a block diagram that schematically illustrates an automotive full-duplex Ethernet communication system, in accordance with an embodiment that is described herein.

Embodiments of the present invention that are described herein provide improved techniques for link training in full-duplex communication systems. The disclosed embodiments are described mainly in the context of automotive Ethernet communication systems, by way of example, but the disclosed techniques are applicable in any other network, Ethernet or other, that utilizes full-duplex links.

In some embodiments, two Ethernet Physical Layer (PHY) transceivers communicate with one another over a full-duplex Ethernet link. The term "full duplex" in the present context means that communication in both uplink and downlink directions is performed over the same physical medium. One typical example is bidirectional communication over a "twisted-pair", i.e., over a single pair of wires.

Each of the two PHY transceivers, for instance a host device and a remote device, comprises a transmitter and a receiver. In an embodiment, the receiver of each PHY transceiver comprises an adaptive equalizer that is configured to filter the received signal. The equalizer is adaptive in that its coefficients (also referred to as "taps") are programmable. The equalizer coefficients are typically set to values that compensate for the channel response of the Ethernet link.

In an embodiment, each of the PHY transceivers further comprises an echo canceler, which is configured to cancel echoes of the transmitted signal that may be present in the received signal. Echo cancellation involves, in a typical implementation, obtaining a replica of the transmitted signal from the transmitter, setting the gain and phase of the replica to match the respective gain and phase of the echo in the received signal, and then subtracting the matched replica from the received signal.

In practice, both channel characteristics and echo characteristics may vary from one link to another and/or over time. Therefore, the equalizer coefficients and the echo canceler parameters (gain and phase) should be adapted. In the present context, adaptation of an equalizer and/or an echo canceler (and/or a crosstalk canceler, as discussed further below) are referred to jointly as "link training". Each PHY transceiver typically comprises a controller that, among other tasks, manages the link training process. Link training is typically performed upon initialization of the link. In some embodiments training can also be performed during operation, e.g., in response to an abrupt change in channel conditions.

As will be described in detail herein, in some embodiments each PHY transceiver performs link training concurrently with the other PHY transceiver (referred to as "peer transceiver"), and independently of the progress of the link training process in the peer transceiver.

In some embodiments, each PHY transceiver transmits a training signal to the peer transceiver over the full-duplex link, and concurrently receives a training signal from the peer transceiver. In some embodiments, the equalizers and/or the echo cancelers of the two PHY transceivers are trained concurrently using the training signals. In an example implementation, each PHY transceiver first trains its echo canceler, and then proceeds to train its equalizer regardless of the progress of training in the peer transceiver. Other training orders or sequences are also possible.

In the context of the present disclosure and in the claims, the term "concurrently" means "at least partially overlapping". For example, a PHY transceiver may begin link training slightly before or slightly after the peer transceiver. Similarly, one PHY transceiver may complete the link training process slightly before or slightly after the peer transceiver. Typically, however, at least a major part of the link training process overlaps in time in the two PHY transceivers, thereby shortening the overall link training duration.

In some embodiments, each PHY transceiver transmits a respective training signal according to a local clock (also referred to as "transmitter clock"). Concurrently, each PHY transceiver locks its receiver clock on a received training signal (the training signal received from the peer transceiver), independently of the transmitter clock. In this manner, each direction of the full-duplex link is governed by a clock that is independent of the clock of the other direction. This independence is maintained both during link training and during subsequent communication.

The use of independent clocks for transmission and reception in a PHY transceiver creates a challenge for echo cancellation, because the received signal and the locally-obtained replica of the transmitted signal are synchronized to different clocks. In some embodiments described herein, each PHY transceiver resamples the replica of the transmitted signal using the receiver clock. The resampled replica of the transmitted signal is synchronized to the same clock as the received signal, and therefore can be readily subtracted from the received signal. Resampling of the replica of the transmitted signal can be performed either before or after matching in gain and phase to the echo in the received signal.

In some embodiments, the training signals being used for link training are modulated using the same modulation scheme that is subsequently used for data transmission. In an embodiment, the modulation scheme is four-level Pulse Amplitude Modulation ("PAM-4"). In other embodiments the modulation may be, for example, PAM-2, PAM-5, PAM-16, or any other suitable modulation scheme.

The disclosed link training techniques do not require any silent periods in which PHY transceivers are forced not to transmit. Moreover, the disclosed link training processes are symmetrical, e.g., in the sense that none of the PHY transceivers has to be defined as a primary PHY device for the link. The data rates in the two link directions can also be set independently of one another. Furthermore, since the two PHY transceivers perform link training independently, and use the same modulation used for data communication, the need for complex state machines and/or complex coordination ("handshaking") between the PHY transceivers is obviated. The disclosed link training processes are thus accurate, fast, simple to implement, and enable simpler interoperability and lower cost.

Moreover, when using the disclosed link training processes, failure in one link direction does not halt communication in the other direction. The disclosed techniques also enable power saving in asymmetric links in which the two link directions differ in their respective data rates.

FIG. 1 is a block diagram that schematically illustrates an automotive full-duplex Ethernet communication system 20, in accordance with an embodiment that is described herein. In the embodiment described, system 20 is installed in a vehicle 24, and comprises multiple sensors 28 that communicate with a central computer (CC) 32. In other embodiments (not seen), system 20 may be installed in an industrial network or other suitable network comprising sensors that communicate with a central computer. In various embodiments, sensors 28 may comprise any suitable types of sensors. Several non-limiting examples of sensors comprise video cameras, velocity sensors, accelerometers, audio sensors, infra-red sensors, radar sensors, lidar sensors, ultrasonic sensors, rangefinders or other proximity sensors, and the like.

Sensors 28 and CC 32 communicate via an Ethernet network comprising multiple Ethernet PHY transceivers 36, multiple network links 40 and an Ethernet switch 44. Elements such as Medium Access Control (MAC) devices are not shown in the figure for the sake of clarity. In the present example, PHY transceiver 36 of each sensor 28 is connected by a network link 40 to a peer PHY transceiver 36 coupled to a port of switch 44. CC 32 is also connected to a port of switch 44 in a similar manner, via a network link 40 and a pair of PHY transceivers 36. Ethernet links 40 are full-duplex links, e.g., twisted-pair cables.

In various embodiments, PHY transceivers 36 of system 20 may communicate over network links 40 at any suitable bit rate. Example bit rates are 2.5 Gb/s, 5 Gb/s or 10 Gb/s, in accordance with the IEEE 802.3ch-2020 standard, cited above.

An inset at the bottom of FIG. 1 focuses on a pair of PHY transceivers 36 that communicate over a full-duplex twisted-pair link 40. The inset shows a detailed internal structure for the right-hand-side PHY transceiver, by way of example. The peer (left-hand-side) PHY transceiver typically has a similar structure, as do the other PHY transceivers in the system.

In the present example, PHY transceiver 36 comprises a hybrid combiner 48 that serves as a bidirectional interface to cable 40. The transmitter (TX) of PHY transceiver 36 comprises a symbol mapper 52, a Digital-to-Analog Converter (DAC) 56, and a clock source 80. The receiver (RX) of PHY transceiver 36 comprises an Analog-to-Digital Converter (ADC) 60, an adaptive equalizer 64 and a clock recovery module 76. PHY transceiver 36 further comprises a resampling module 72 and an echo canceler 68.

On transmission, clock source 80 generates a clock signal, also referred to as "transmitter clock". Symbol mapper 52 receives bits for transmission ("TX bits") and maps them onto PAM-4 symbols. The sequence of PAM-4 symbols, also referred to as a digital TX signal, is synchronized to the transmitter clock. DAC 56 converts the digital TX signal into an analog TX signal for transmission. The analog TX signal is transmitted via hybrid 48 on cable 40 to the peer PHY transceiver.

On reception, an analog RX signal is received from the peer PHY transceiver, on cable 40 via hybrid 48. ADC 60 digitizes the analog RX signal, i.e., converts the analog RX signal into a digital RX signal. Equalizer 64, typically comprising a digital filter having programmable coefficients, filters the digital RX signal so as to compensate for the channel response of cable 40. A decision circuit (e.g., slicer, not seen in the figure) extracts and outputs a sequence of received bits. Clock recovery module 76 recovers a receiver clock from the digital signal at the output of equalizer 64.

PHY transceiver 36 typically transmits Ethernet signals (over link 40 to the peer PHY transceiver) and receives Ethernet signals (over link 40 from the peer PHY transceiver) at the same time. In practice, an echo component of the TX signal may appear in the RX signal. The echo may be generated by various mechanisms, e.g., due to reflection or leakage in hybrid 48 or other system components. In some embodiments, echo canceler 68 cancels the echo by (i) taking a replica of the digital TX signal, (ii) matching the replica in gain and phase to the echo component of the TX signal in the digital RX signal, and (iii) subtracting the replica from the digital RX signal. These operations are typically performed entirely in the digital domain, e.g., using hardware and/or in a Digital Signal Processor (DSP).

As noted above, the digital TX signal is synchronized to the transmitter clock generated by clock source 80. The digital RX signal, on the other hand, is synchronized to the receiver clock recovered from the received signal. The receiver clock and the transmitter clock are independent of one another. In order to perform echo cancellation given this clock independence, resampling module 72 resamples the replica of the digital TX signal using the receiver clock. The resampled replica is provided to echo canceler 68. The resampled replica and the digital RX signal are synchronized to the same clock (the receiver clock). Therefore, echo canceler 68 is able to subtract the resampled replica from the digital RX signal, thereby removing the echo. The echo-canceled signal is provided as input to equalizer 64. In an alternative embodiment, resampling module 72 may be placed after echo canceler 68, i.e., resample the replica of the transmitted signal after matching in gain and phase to the echo in the received signal.

In the embodiment of FIG. 1, PHY transceiver 36 further comprises a controller 84 that manages the operation of the PHY transceiver and controls the various PHY transceiver components. Among other tasks, controller 84 carries out the link training process described herein.

The configurations of system 20 and of PHY transceiver 36, as shown in FIG. 1, are example configurations that are depicted solely for the sake of clarity. In alternative embodiments, any other suitable configurations can be used. The different elements of PHY transceiver 36 may be implemented using dedicated hardware or firmware, such as using hard-wired or programmable logic, e.g., in an Application-Specific Integrated Circuit (ASIC) or Field-Programmable Gate Array (FPGA). Additionally, or alternatively, some functions of PHY transceiver 36 may be implemented in software and/or using a combination of hardware and software elements. Elements that are not mandatory for understanding of the disclosed techniques have been omitted from the figure for the sake of clarity.

In some embodiments, some functions of the disclosed PHY transceivers may be implemented in one or more programmable processors, e.g., one or more Central Processing Units (CPUs), microcontroller and/or Digital Signal Processors (DSPs), which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

Figure 2:
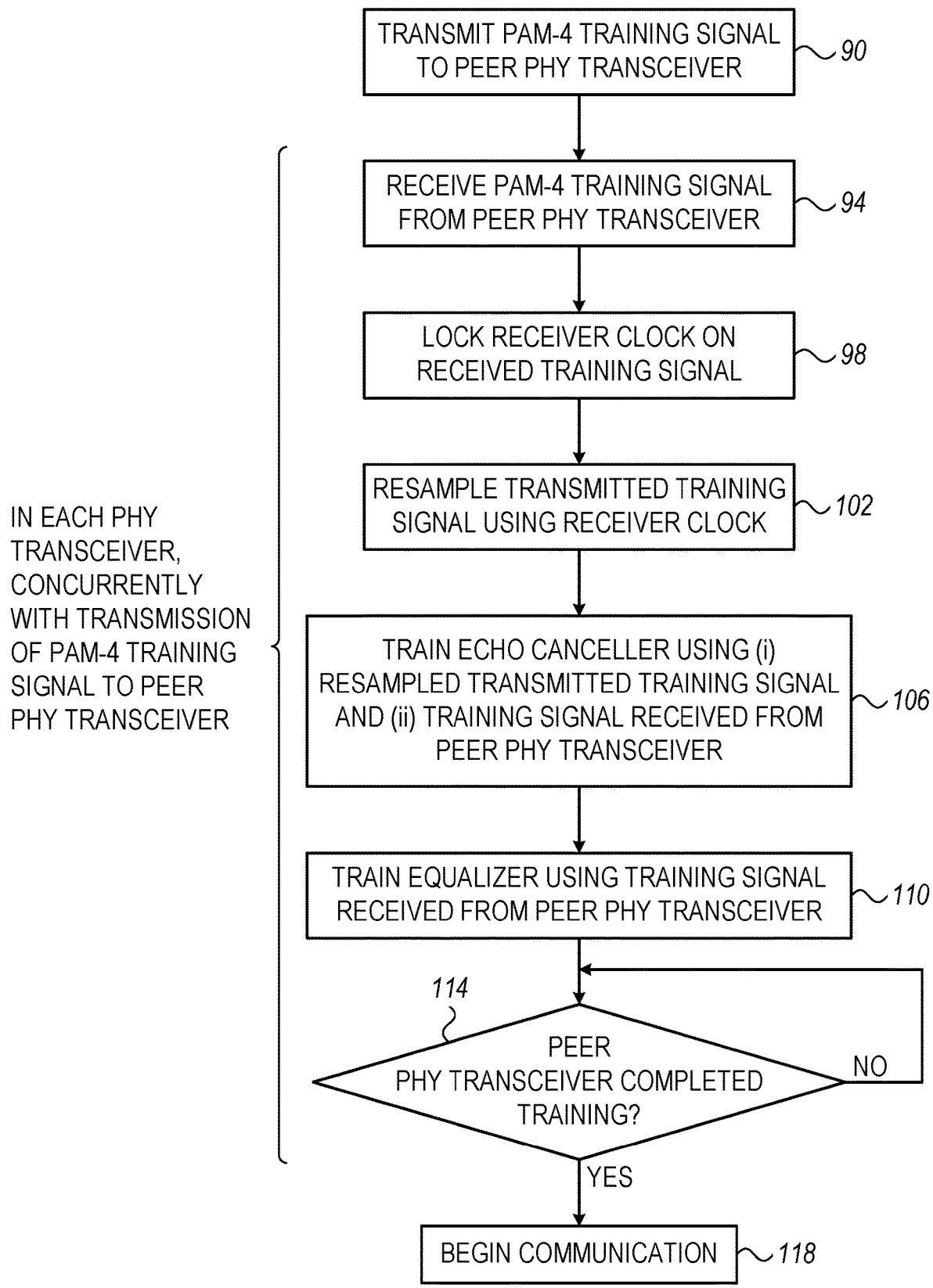
FIG. 2 is a flow chart that schematically illustrates a method for link training in the full-duplex Ethernet communication system of FIG. 1, in accordance with an embodiment that is described herein.

FIG. 2 is a flow chart that schematically illustrates a method for link training in system 20 of FIG. 1, in accordance with an embodiment that is described herein. The flow chart shows the operations performed by a given PHY transceiver 36, as part of establishing communication with a peer PHY transceiver 36. The peer PHY transceiver typically carries out a similar process concurrently.

The method of FIG. 2 typically begins on initialization of the link, e.g., on power-up of PHY transceiver 36. The method begins with the transmitter of PHY transceiver 36 transmitting a training signal to the peer PHY transceiver, at a transmission operation 90. At the same time, the receiver of PHY transceiver 36 begins receiving a training signal from the peer PHY transceiver, at a reception operation 94. ADC 60 digitizes the received training signal.

In some embodiments, the training signals used in system 20 comprise Maximal-Length (ML) pseudorandom sequences whose seed values are known to both PHY transceivers. In other embodiments, other suitable training signals can be used. In the present embodiment the training signals are modulated using PAM-4.

At a clock recovery operation 98, clock recovery module 76 in PHY transceiver 36 recovers the receiver clock from the received training signal and locks the receiver on the receiver clock. At a resampling operation 102, resampling module 72 resamples the transmitted training signal (the digital version of the transmitted training signal, before conversion to an analog signal by DAC 56) using the recovered receiver clock.

At an echo-canceler training operation 106, controller 84 trains echo canceler 68 based on (i) the resampled version of the transmitted training signal, and (ii) the digital version of the training signal received from the peer PHY transceiver. The echo-canceler training operation typically comprises estimating the gain and phase that, when applied to the resampled version of the transmitted training signal, achieves maximal echo cancellation (e.g., highest signal-to-noise ratio or maximum likelihood with the known training signal).

At an equalizer training operation 110, controller 84 trains equalizer 64 based on the digital version of the training signal received from the peer PHY transceiver. The equalizer training operation typically comprises estimating the equalizer coefficients that achieve best equalization (e.g., highest signal-to-noise ratio or maximum likelihood with the known training signal).

At a peer completion checking operation 114, controller 114 checks whether the peer PHY transceiver has completed its link training process. When both PHY transceivers completed their respective link processing processes, controller 84 begins to communicate data with the peer PHY transceiver, at a communication operation 118.

The method flow of FIG. 2 is an example flow that is depicted solely for the sake of conceptual clarity. In alternative embodiments, any other suitable method can be used. For example, in an alternative flow, one of the PHY transceivers is designated to serve as a primary PHY transceiver and the other PHY transceiver is designated to serve as a secondary PHY transceiver. The link training process begins with the two PHY transceivers concurrently transmitting a PAM-2 training signal. The two PHY transceivers initially train their echo cancelers using the training signals. The secondary PHY transceiver then locks its receiver clock on the received signal, and notifies the primary PHY transceiver. Both PHY transceivers then train their adaptive equalizers.

In some embodiments PHY transceiver 36 employs measures for achieving accurate link training given the modest performance of PAM-4 modulation. In comparison with more sparse modulation schemes such as PAM-2, PAM-4 has a smaller Euclidean distance between symbols, and therefore a higher chance of error. Despite this, in some embodiments, controller 84 may use PAM-4 for initial training instead of PAM-2, especially when PAM-4 is the modulation of the data. By using PAM-4 for training, there is no need to switch from PAM-2 to PAM-4. Controller 84 can compensate for the smaller Euclidean distance, for example by initializing equalizer 64 with an approximate initial setting. Additionally or alternatively, PHY transceiver 36 may discard data points (decoded symbols) having poor confidence from the echo-canceler and/or equalizer training process.

In some embodiments, two peer PHY transceivers 36 communicate over two or more twisted-pair links in parallel (i.e., Ethernet link 40 comprises multiple wire pairs). In practice, the signals on different twisted-pair links may cause interference to one another. This kind of interference is referred to as crosstalk. Example types of crosstalk are Near-End Crosstalk (NEXT) and Far-End Crosstalk (FEXT). In these embodiments, a PHY transceiver 36 may further comprise one or more crosstalk cancelers (one or more Near-End Crosstalk (NEXT) cancelers and/or one or more Far-End Crosstalk (FEXT) cancelers), in addition to echo canceler 68.

A given crosstalk canceler cancels a crosstalk component (NEXT or FEXT) in the received signal of one wire pair, originating from another wire pair. A crosstalk canceler operates in a similar manner to echo canceler 36, with the exception that the locally-obtained replica of the transmitted signal is taken from one wire pair, and is subtracted (after gain and phase matching) from the received signal of another wire pair. The disclosed link training technique, including resampling of the replica using the receiver clock, and concurrent training of the NEXT cancelers in the two peer PHY transceivers, can be applied to training a crosstalk canceler in a similar manner to training echo canceler 36.

As noted above, in some embodiments the training signal uses the same modulation used for subsequent data transfer (in the present example PAM-4). In an embodiment, PHY device 36 comprises the following features in order to support training by a PAM-4 signal:

Frame synchronization. The PHY transceiver transmitter typically encodes the transmitted data with an Error Correction Code (ECC) that is decoded by the receiver of the peer PHY transceiver. ECC encoding and decoding are frame-based operations. The receiver should therefore be aware of the start of each code frame. In an embodiment, to allow link training using a PAM-4 signal, the PHY device transmitter sends a fixed signature sequence, which is adapted for PAM-4, at the beginning of each frame. The receiver of the peer PHY transceiver detects these signatures.

Communicating critical training messages (referred to as "info field") to the peer PHY transceiver during training, using PAM-4.

Generating the right training signals. As noted above, the link training process may assume that the training signal is known to the receiver in advance. In an embodiment, generation of the seed of the training signal, and detection of the seed, are adapted to PAM-4.

Although the embodiments described herein mainly address link training in automotive networks, the methods and systems described herein can also be used in other applications, such as for link training in various other networks that use full duplex links. Examples may comprise PHY transceivers in enterprise and data center copper-based communication, e.g., 100 M,1/2.5/5/10/25G base-T.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A communication system, comprising:
a first physical-layer (PHY) transceiver, comprising (i) a first transmitter and (ii) a first receiver comprising a first equalizer; and
a second PHY transceiver, comprising (i) a second transmitter and (ii) a second receiver comprising a second equalizer,
wherein the first PHY transceiver and the second PHY transceiver are configured to communicate with one another over a full-duplex link, including training the first equalizer on a second training signal transmitted from the second PHY transceiver, and concurrently training the second equalizer on a first training signal transmitted from the first PHY transceiver,
the first PHY transceiver configured to initiate training of the first equalizer while the first training signal is being transmitted and while the second training signal is being received.

2. The communication system according to claim 1, wherein the first PHY transceiver further comprises a first echo canceler, and the second PHY transceiver further comprises a second echo canceler; and wherein the first PHY transceiver and the second PHY transceiver are configured to train the first echo canceler and the second echo canceler concurrently, using the first and second training signals.

3. The communication system according to claim 1, wherein the first PHY transceiver further comprises a first crosstalk canceler, and the second PHY transceiver further comprises a second crosstalk canceler; and wherein the first PHY transceiver and the second PHY transceiver are configured to train the first crosstalk canceler and the second crosstalk canceler concurrently, using the first and second training signals.

4. The communication system according to claim 1, wherein the first PHY transceiver is configured to transmit the first training signal using a same modulation subsequently used for transmitting data to the second PHY transceiver.

5. The communication system according to claim 1, wherein the first PHY transceiver is configured to transmit the first training signal in accordance with a first clock signal; and wherein the second PHY transceiver is configured to transmit the second training signal in accordance with a second clock signal that is independent of the first clock signal.

6. The communication system according to claim 5, wherein the first PHY transceiver further comprises:
a clock recovery circuit, configured to recover the second clock signal from the second training signal received from the second PHY transceiver;
a resampling circuit configured to resample the first training signal produced in the first transmitter, in accordance with the recovered second clock signal; and
a first echo canceler, configured to cancel, using the resampled first training signal, an echo of the first training signal in the received second training signal.

7. The communication system according to claim 1, wherein the first PHY transceiver is configured to transmit the first training signal using four-level Pulse-Amplitude Modulation (4-PAM).

8. A physical-layer (PHY) transceiver, comprising:
an interface, configured to connect to a full-duplex link for communicating with a peer PHY transceiver;
a transmitter, configured to transmit a first training signal to the peer PHY transceiver;
a receiver comprising an equalizer, the receiver configured to receive a second training signal from the peer PHY transceiver; and
a controller, configured to initiate training of the equalizer while the first training signal is being transmitted and while the second training signal is being received.

9. A communication method, comprising:
transmitting a first training signal from a first physical-layer (PHY) transceiver to a second PHY transceiver over a full-duplex link;
transmitting a second training signal from the second PHY transceiver to the first PHY transceiver over the full-duplex link; and
training a first equalizer in the first PHY transceiver using the second training signal transmitted from the second PHY transceiver, and concurrently training a second equalizer in the second PHY transceiver using the first training signal transmitted from the first PHY transceiver, including, in the first PHY transceiver, initiating training of the first equalizer while the first training signal is being transmitted and while the second training signal is being received.

10. The communication method according to claim 9, further comprising training a first echo canceler in the first PHY transceiver, and concurrently training a second echo canceler in the second PHY transceiver, using the first and second training signals.

11. The communication method according to claim 9, further comprising training a first crosstalk canceler in the first PHY transceiver, and concurrently training a second crosstalk canceler in the second PHY transceiver, using the first and second training signals.

12. The communication method according to claim 9, wherein transmitting the first training signal comprises modulating the first training signal using a same modulation subsequently used for transmitting data from the first PHY transceiver to the second PHY transceiver.

13. The communication method according to claim 9,
wherein transmitting the first training signal is performed in accordance with a first clock signal; and
wherein transmitting the second training signal is performed in accordance with a second clock signal that is independent of the first clock signal.

14. The communication method according to claim 13, further comprising, in the first PHY transceiver:
recovering the second clock signal from the second training signal received from the second PHY transceiver;
resampling the first training signal, produced in the first PHY transceiver, in accordance with the recovered second clock signal; and
canceling, using the resampled first training signal, an echo of the first training signal in the received second training signal.

15. The communication method according to claim 9, wherein transmitting the first training signal comprises modulating the first training signal using four-level Pulse-Amplitude Modulation (4-PAM).

16. A communication method, comprising:
using a physical layer (PHY) transceiver, communicating with a peer PHY transceiver over a full-duplex link, including transmitting a first training signal to the peer PHY transceiver and receiving a second training signal from the peer PHY transceiver; and
initiating training of an equalizer of the PHY transceiver while the first training signal is being transmitted and while the second training signal is being received.

* * * * *